Patented Jan. 19, 1943

2,308,489

UNITED STATES PATENT OFFICE 2,308,489

MANUFACTURE OF HALOGENATED OLEFINS

Oliver W. Cass, Niagara Falls, N. Y., assignor to E. I. du Pont de Nemours & Company, Wilmington, Del., a corporation of Delaware No Drawing. Application August 21, 1940, Serial No. 353,542

12 Claims. (Cl. 260—654)

This invention relates to the preparation of unsaturated halogenated hydrocarbons and, more particularly, it is directed to the preparation of halogenated olefins by the reaction of oxygen and hydrogen halides with olefinic hydrocarbons.

It has been known heretofore to prepare saturated chlorinated hydrocarbons by the addition of hydrogen halide to the double bond of an olefin. Thus, for example, ethyl chloride may be prepared readily by the reaction of hydrogen chloride with ethylene. However, it has not heretofore been considered possible to effect substitution halogenation of olefins by means of hydrogen halides.

An object of the present invention is to provide a new and improved method for preparing halogenated olefinic hydrocarbons. A further object is to provide a method of preparing halogenated olefins wherein olefins, oxygen and hydrogen halides are utilized as raw materials. A further object is to provide a method for the halogenation of olefins wherein substitution halogenation products are the predominating products, to the substantial exclusion of addition compounds. Other objects and advantages of the invention will be apparent hereinafter.

These objects are attained in accordance with the present invention by reacting an olefinic hydrocarbon with a hydrogen halide and oxygen in the presence of an oxidation catalyst at a temperature on the order of 250 to 600° C. Thus, for example, by the reaction of ethylene with hydrogen chloride and oxygen, I may obtain various chlorinated ethylenes such as vinyl chloride, dichlorethylene, trichlorethylene, and perchlorethylene. The reactions which take place may be represented by the following equations:

(1) $CH_2=CH_2+HCl+\frac{1}{2}O_2 \rightarrow CHCl=CH_2+H_2O$
(2) $CH_2=CH_2+2HCl+O_2 \rightarrow CHCl=CHCl+2H_2O$
(3) $CH_2=CH_2+3HCl+1\frac{1}{2}O_2 \rightarrow$

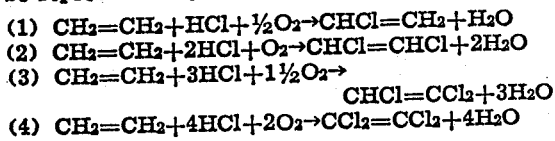
$CHCl=CCl_2+3H_2O$ (4) $CH_2=CH_2+4HCl+2O_2 \rightarrow CCl_2=CCl_2+4H_2O$ The reaction may be carried out by mixing the olefin with the hydrogen halide and air or oxygen and passing the mixture over the catalyst in a heated reaction chamber; or, if desired, the three constituents may be introduced into the reaction space in separate streams; or the air or oxygen may be introduced into a mixture of the olefin and hydrogen halide. It should be noted, however, that the olefin and oxygen should not be permitted to reach reaction temperature in the absence of the hydrogen halide.

The products of reaction may be recovered by subjecting the gases leaving the reaction chamber to refrigeration to condense the halogenated olefins. The crude liquid product, after neutralization of any free acid present, may then be separated into its various constituents by the usual methods of fractional distillation.

The relative proportions of the reactants used will vary considerably, depending upon the particular olefin employed and also upon the desired final product. Thus, as indicated by the equations given above, one mole of hydrogen chloride and one-half mole of oxygen are required for the conversion of one mole of ethylene to vinyl chloride, whereas four moles of hydrogen chloride and two moles of oxygen are theoretically required for conversion of one mole of ethylene to perchlorethylene. In practice, of course, not all of the hydrogen halide will be reacted, usually about 5 to 10% of that fed into the reaction chamber remaining as free hydrogen halide in the reaction products, while about 90 to 95% of the halogen content of the hydrogen halide is converted to halogenated hydrocarbons. When the higher halogenated compounds are the ultimate products desired, the constituents of the reaction product which are of a lower degree of chlorination may be recycled in the process and thereby excellent yields of higher halogenated products are secured. On the other hand, when the lower halogenated compounds are the desired products, the amount of higher halogenated compounds produced may be decreased by increasing the ratio of olefin to hydrogen halide and oxygen, and recycling the unreacted excess olefin.

The use of an oxidation catalyst is essential in order to obtain good yields of unsaturated halogenated compounds. Practically all of the oxidation catalysts known in the art are effective, at least to some degree, in promoting the reaction. In general, I prefer to utilize metals or metal compounds such as oxides and salts. The preferred catalysts are oxides or compounds of copper, iron and bismuth and, in general, the best results are obtained by the use of a copper catalyst which may be in the metallic state or as copper oxide or a copper salt. Many other metals and their compounds, however, have been found to be effective as, for example, zinc oxide, barium oxide, alumina, various rare earth oxides, magnesium oxide, manganese oxide, silver oxide, titanium dioxide, lead oxide, bismuth oxide, cobalt oxide, nickel oxide, magnesium sulfate, and molybdenum dioxide.

Preferably the catalysts are deposited on refractory supports such as pumice, silica gel, alumina gel, fire brick, porcelain, or the like. Such supported catalysts may readily be prepared by saturating a porous refractory material with a solution of the metal salt or metal compound. If the metal compound used is readily converted to the oxide under the conditions of the reaction, it is simply necessary to dry the saturated catalyst support and then it is ready for use. In other cases, it may be preferable first to reduce the metal compound on the support to the metallic form which then may be oxidized, preferably by heating the catalyst in an atmosphere of air or oxygen prior to use. The various methods known for preparing catalysts according to these principles may be utilized in practicing my invention. I have obtained excellent results in a large number of reactions by saturating fire brick with solutions of copper salts such as the sulfate, nitrate, or chloride.

The following examples are given as further illustrating the principles of the invention, it being understood, however, that the invention is not of course limited in any way to these specific embodiments.

*Example I*

A mixture of ethylene (100 moles), hydrogen chloride (300 moles) and oxygen (165 moles) is passed over a catalyst consisting of copper oxide supported upon fire brick at a temperature of 375 to 425° C. For each 100 moles of ethylene there are produced 10 to 20 moles of symmetrical dichlorethylene, 20 to 30 moles of trichlorethylene, and 30 to 40 moles of perchlorethylene, with minor proportions (ranging up to perhaps 5 moles) of vinyl chloride. Minor amounts of carbon monoxide and carbon dioxide, produced by the direct oxidation of the ethylene, are also formed, as well as small amounts of saturated hydrocarbons such as dichloro-, trichloro-, tetrachloro-, and pentachloroethanes.

*Example II*

By carrying out the same procedure as described in Example I, but utilizing an initial mixture consisting of 100 moles of ethylene, 400 moles of hydrogen chloride, and 220 moles of oxygen, there is obtained a product which is substantially free from unconverted ethylene and vinyl chloride and containing 5 to 10% dichlorethylene, 25 to 35% trichlorethylene, and 50 to 60% perchlorethylene. By recycling the dichlor- and trichlorethylenes it is possible to obtain a yield of 75 to 80% of tetrachlorethylene.

*Example III*

By carrying out the same procedure as in Examples I and II with a mixture consisting of 100 moles of ethylene, 200 moles of hydrogen chloride, and 100 moles of oxygen, there is obtained a reaction product comprising 10 to 30 moles of unreacted ethylene, 35 to 50 moles of vinyl chloride, 10 to 20 moles of dichlorethylene, 10 to 20 moles of trichlorethylene, and 5 to 10 moles of perchlorethylene.

While in the foregoing description of the invention reference has been made particularly to ethylene as the olefinic raw material, the invention is not restricted to the use of ethylene, inasmuch as it is generally applicable to the halogenation of olefinic hydrocarbons in general. Thus, when propylene is reacted with oxygen and hydrogen chloride under similar conditions, chloropropylenes such as allyl chloride $(CH_2=CHCH_2Cl)$ and alpha methyl vinyl chloride $(CH_2=CClCH_3)$ are obtained as the principal products, with minor proportions of decomposition products of these compounds such as methyl acetylene $(CH\equiv CH_3)$ and allylene $(CH_2C=CH_2)$; also various polychloropropylenes such as $CH_3CH=CCl_2$ and $CH_3CCl=CCl_2$.

Similarly, with butylene and butadiene various chlorinated butylenes and chlorobutadienes such as chloroprene $(CH_2=CClCH=CH_2)$ are obtained. The reaction may also be applied to the chlorination of higher olefins, although of course, as the number of carbon atoms in the olefin increases, the complexity of the reaction products proportionately increases due to the large number of possible isomers obtainable.

The reaction may also be carried out with hydrogen bromide to prepare the corresponding brominated olefins. When hydrogen bromide is used as the hydrohalide, the optimum reaction temperatures are somewhat lower than with hydrogen chloride.

It is to be understood that the invention is not confined to the specific embodiments described hereinabove, but includes all such variations, modifications, and equivalents as fall within the scope of the appended claims.

I claim:

1. The method of effecting substitution halogenation of an olefinic hydrocarbon containing from two to four carbon atoms which comprises reacting the same with a hydrogen halide having a molecular weight between 36 and 81 and oxygen in the presence of an oxidation catalyst at a temperature of 250 to 600° C.

2. The method of effecting substitution chlorination of an olefinic hydrocarbon containing from two to four carbon atoms which comprises reacting the same with hydrogen chloride and oxygen in the presence of an oxidation catalyst at a temperature of 250 to 600° C.

3. The method of effecting substitution chlorination of an olefinic hydrocarbon containing from two to four carbon atoms which comprises reacting the same with hydrogen chloride and oxygen in the presence of a catalyst comprising essentially a metal oxide at a temperature of 250 to 600° C.

4. The method of effecting substitution chlorination of an olefinic hydrocarbon containing from two to four carbon atoms which comprises reacting the same with hydrogen chloride and oxygen in the presence of a copper compound as a catalyst at a temperature of 250 to 600° C.

5. The method of effecting substitution chlorination of an olefinic hydrocarbon containing from two to four carbon atoms which comprises reacting the same with hydrogen chloride and oxygen in the presence of a copper compound as a catalyst at a temperature of 375 to 425° C.

6. The method of effecting substitution halogenation of ethylene which comprises reacting the same with a hydrogen halide having a molecular weight between 36 and 81 and oxygen in the presence of an oxidation catalyst at a temperature of 250 to 600° C.

7. The method of effecting substitution chlorination of ethylene which comprises reacting the same with hydrogen chloride and oxygen in the presence of an oxidation catalyst at a temperature of 250 to 600° C.

8. The method of effecting substitution chlorination of ethylene which comprises reacting the same with hydrogen chloride and oxygen in the presence of a copper compound as a catalyst at a temperature of 250 to 600° C.

9. The method of effecting substitution chlorination of ethylene which comprises reacting the same with hydrogen chloride and oxygen in the presence of a copper compound as a catalyst at a temperature of 375 to 425° C.

10. The method of effecting substitution halogenation of an olefinic hydrocarbon containing from two to four carbon atoms which comprises reacting the same with a hydrogen halide having a molecular weight between 36 and 81 and oxygen in the presence of a catalyst comprising essentially a metal oxide at a temperature of 250 to 600° C.

11. The method of effecting substitution halogenation of an olefinic hydrocarbon containing from two to four carbon atoms which comprises reacting the same with a hydrogen halide having a molecular weight between 36 and 81 and oxygen in the presence of a copper compound as a catalyst at a temperature of 250 to 600° C.

12. The method of effecting substitution halogenation of an olefinic hydrocarbon containing from two to four carbon atoms which comprises reacting the same with a hydrogen halide having a molecular weight between 36 and 81 and oxygen in the presence of a copper compound as a catalyst at a temperature of 375 to 425° C.

OLIVER W. CASS.

CERTIFICATE OF CORRECTION.

Patent No. 2,308,489. January 19, 1943.

OLIVER W. CASS.

It is hereby certified that error appears in the printed specification of the above numbered patent requiring correction as follows: Page 2, second column, line 7, for "$(CH\equiv CH_3)$" read --$(CH\equiv CCH_3)$--; and that the said Letters Patent should be read with this correction therein that the same may conform to the record of the case in the Patent Office.

Signed and sealed this 23rd day of February, A. D. 1943.

Henry Van Arsdale,
Acting Commissioner of Patents.

(Seal)